United States Patent
Arad

(10) Patent No.: US 7,945,233 B2
(45) Date of Patent: May 17, 2011

(54) SYSTEMS AND METHODS FOR DYNAMICALLY CONTROLLING A TUNER

(75) Inventor: Oren Arad, Santa Clara, CA (US)

(73) Assignee: SiPort, Inc., Santa Clara, CA (US)

( * ) Notice: Subject to any disclaimer, the term of this patent is extended or adjusted under 35 U.S.C. 154(b) by 572 days.

(21) Appl. No.: 11/454,268

(22) Filed: Jun. 16, 2006

(65) Prior Publication Data
US 2006/0287009 A1    Dec. 21, 2006

Related U.S. Application Data

(60) Provisional application No. 60/690,838, filed on Jun. 16, 2005.

(51) Int. Cl.
H04B 1/16 (2006.01)
(52) U.S. Cl. ............ 455/343.1; 455/161.3; 455/226.2
(58) Field of Classification Search ............ 455/161.2, 455/161.3, 226.1, 226.2, 226.3, 234.2, 239.1, 455/343.1
See application file for complete search history.

(56) References Cited

U.S. PATENT DOCUMENTS

| | | |
|---|---|---|
| 4,710,747 A | 12/1987 | Holland |
| 4,761,644 A | 8/1988 | Kawai et al. |
| 4,910,752 A | 3/1990 | Yester, Jr. et al. |
| 5,140,698 A | 8/1992 | Toko |
| 5,155,479 A | 10/1992 | Ragan |
| 5,325,088 A | 6/1994 | Willard et al. |
| 5,555,183 A | 9/1996 | Willard et al. |
| 5,654,952 A | 8/1997 | Suzuki |
| 5,920,824 A | 7/1999 | Beatty et al. |
| 6,057,795 A | 5/2000 | Suzuki |
| 6,072,784 A | 6/2000 | Agrawal et al. |
| 6,205,225 B1 * | 3/2001 | Orban .................. 381/94.8 |
| 6,219,333 B1 | 4/2001 | Ahn |
| 6,232,905 B1 | 5/2001 | Smith et al. |
| 6,259,681 B1 | 7/2001 | Kolev et al. |
| 6,286,122 B1 | 9/2001 | Alanara |
| 6,317,065 B1 | 11/2001 | Raleigh |
| 6,405,062 B1 | 6/2002 | Izaki |
| 6,407,689 B1 | 6/2002 | Bazarjani et al. |
| 6,438,364 B1 * | 8/2002 | Waite .................. 455/323 |
| 6,466,913 B1 | 10/2002 | Yasuda |
| 6,504,863 B1 | 1/2003 | Hellmark |
| 6,654,595 B1 | 11/2003 | Dexter |
| 6,671,371 B1 | 12/2003 | McNeill et al. |
| 6,693,953 B2 | 2/2004 | Cox et al. |
| 6,754,763 B2 | 6/2004 | Lin |
| 6,763,240 B1 | 7/2004 | Chambers |
| 6,765,931 B1 | 7/2004 | Rabenko et al. |

(Continued)

FOREIGN PATENT DOCUMENTS

JP    2007243504    9/2007

*Primary Examiner* — Edward Urban
*Assistant Examiner* — Christian A Hannon
(74) *Attorney, Agent, or Firm* — Carr & Ferrell LLP

(57) ABSTRACT

Systems and methods for dynamically controlling a tuner are provided. In exemplary embodiments, the tuner receives control signals generated by digital signal processing hardware (DSPHW). These control signals control noise figure and linearity characteristic of components within the tuner by adjusting a current supply to those components, according to a desired configuration determined by the DSPHW. As a result, the DSPHW can optimize power consumption of the tuner while allowing for sufficient tuner performance for reliable demodulation of received signals.

11 Claims, 14 Drawing Sheets

U.S. PATENT DOCUMENTS

| | | |
|---|---|---|
| 6,819,274 B2 | 11/2004 | Krone et al. |
| 6,862,325 B2 | 3/2005 | Gay-Bellile et al. |
| 7,006,617 B1 | 2/2006 | Dal Farra |
| 7,127,008 B2 | 10/2006 | Kroeger |
| 7,205,923 B1 | 4/2007 | Bahai |
| 7,233,275 B2 | 6/2007 | Aksin et al. |
| 7,299,021 B2 * | 11/2007 | Parssinen et al. .......... 455/226.1 |
| 7,369,989 B2 | 5/2008 | Absar |
| 7,480,689 B2 | 1/2009 | Song |
| 7,555,661 B2 | 6/2009 | Luu |
| 2002/0126778 A1 | 9/2002 | Ojard |
| 2002/0169009 A1 | 11/2002 | Reiner |
| 2003/0078007 A1 | 4/2003 | Parssinen et al. |
| 2003/0159076 A1 | 8/2003 | Delisle |
| 2004/0080675 A1 | 4/2004 | Hoshino |
| 2004/0145508 A1 | 7/2004 | Gulati et al. |
| 2004/0223449 A1 | 11/2004 | Tsuie et al. |
| 2005/0047488 A1 | 3/2005 | Sugahara |
| 2005/0081245 A1 | 4/2005 | Arad et al. |
| 2005/0094036 A1 | 5/2005 | Tichelaar |
| 2005/0239518 A1 | 10/2005 | D'Agostino et al. |
| 2006/0001779 A1 | 1/2006 | Favrat et al. |
| 2006/0082690 A1 | 4/2006 | Englert |
| 2006/0112157 A1 | 5/2006 | Song |
| 2006/0141974 A1 | 6/2006 | Campbell |
| 2006/0195498 A1 | 8/2006 | Dobbek |
| 2006/0212503 A1 | 9/2006 | Beckmann |
| 2007/0080800 A1 | 4/2007 | Carbone |
| 2007/0112901 A1 | 5/2007 | Niktash |
| 2007/0176816 A1 | 8/2007 | Wood |
| 2008/0097764 A1 | 4/2008 | Grill |
| 2009/0198753 A1 | 8/2009 | Touimi |

* cited by examiner

| | Desired Power Category High | Desired Power Category Medium | Desired Power Category Low |
|---|---|---|---|
| Blocker Power Category High | THb2<B2D and THpd2<PDe | THb2<B2D and THpd1<Pde<THpd2 | THb2<B2D and Pde<THpd1 |
| Blocker Power Category Medium | Thb1<B2D<THb2 and THpd2<PDe | Thb1<B2D<THb2 and THpd1<Pde<THpd2 | Thb1<B2D<THb2 and Pde<THpd1 |
| Blocker Power Category Low | B2D<THb1 and THpd2<PDe | B2D<THb1 and THpd1<Pde<THpd2 | B2D<THb1 and Pde<THpd1 |

FIG. 6

|  | Desired Power Category High | Desired Power Category Medium | Desired Power Category Low |
|---|---|---|---|
| Blocker Power Category High | Nfe = 3<br>LN1e = 2<br>LN2e = 2 | Nfe = 2<br>LN1e = 2<br>LN2e = 2 | Nfe = 1<br>LN1e = 3<br>LN2e = 2 |
| Blocker Power Category Medium | Nfe = 3<br>LN1e = 1<br>LN2e = 1 | Nfe = 2<br>LN1e = 2<br>LN2e = 2 | Nfe = 1<br>LN1e = 2<br>LN2e = 2 |
| Blocker Power Category Low | Nfe = 3<br>LN1e = 1<br>LN2e = 1 | Nfe = 1<br>LN1e = 1<br>LN2e = 1 | Nfe = 1<br>LN1e = 1<br>LN2e = 1 |

FIG. 7

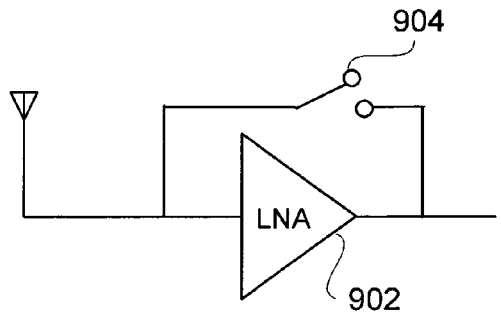
FIG. 9
| Condition | # of Active Stages |
|---|---|
| P_adj<TH1 | 1 |
| TH1<P_adj<TH2 | 2 |
| P_adj>TH2 | 3 |
FIG. 15
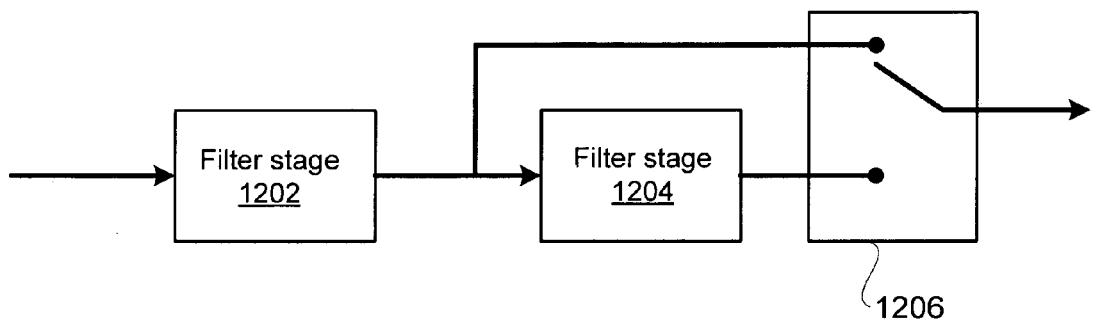
FIG. 12
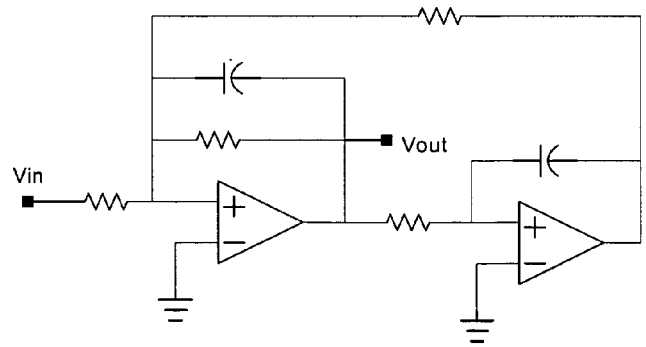
FIG. 13

SYSTEMS AND METHODS FOR DYNAMICALLY CONTROLLING A TUNER

CROSS-REFERENCE TO RELATED APPLICATION

The present application claims the priority benefit of U.S. Provisional Patent Application No. 60/690,838 entitled "System and Methods for Dynamic Control of Tuner" filed Jun. 16, 2005, which is herein incorporated by reference

BACKGROUND OF THE INVENTION

1. Field of Invention

Embodiments of the present invention are related to audio processing, and more particularly to control of a tuner.

2. Related Art

Conventionally, wireless communication reception in mobile devices requires use of high performance receivers that comply with stringent power consumption constraints. A receiver for broadcast services is expected to provide reliable reception under multiple channel impairments such as multipath fading, Doppler shift, impulse noise, and narrowband noise. A high performance implementation of the receiver can achieve significant improvement of reception range and indoor coverage. Communication and broadcast systems which operate in the VHF/UHF band have particularly high requirements for tuner performance. The VHF/UHF band is populated with an ensemble of high power broadcast transmissions of terrestrial analog TV and radio, as well as aeronautical and governmental transmissions. Receivers operating in these bands are required to handle large dynamic ranges of both a signal of interest and signals in adjacent channels that resides in the VHF/UHF band.

One criterion for a tuner's performance is receiver sensitivities: a minimum receive power at which a digital signal can be reliably decoded in, or an analog signal can be received with some desired signal-to-noise ratio (SNR). Lower receiver sensitivity will enable the receiver to operate at a greater distance from the transmitting antenna. Low receiver sensitivity translates to low noise figure in the tuner.

Another measurement of receiver performance is tolerance to a blocker signal. A blocker signal is a high power signal outside the frequency band of the received channel. Such a blocker signal will be present when the receiver is in proximity to a high power transmitting antenna, which transmits a signal of a frequency band that is close to the received channel frequency. This high tolerance to blocker signals results in high linearity requirements of the tuner's components. The high linearity produces a signal at the output of a receiver component having low non-linear distortions, such as second and third order distortions.

A fundamental tradeoff in any tuner design is power versus noise figure and linearity. For any given tuner architecture, a tuner which is designed for very low noise figure and high linearity will consume much more power then the same tuner with relaxed requirements of noise figure and linearity. Generally, a low noise amplifier (LNA) linearity is inversely proportional to a ratio of the AC signal to the LNA DC bias current. Therefore for a given input radio frequency signal swing to the LNA, increasing the LNA bias current improves linearity (e.g., almost 6 dB every time the bias current is doubled). Furthermore, device speed improves with increased bias current. Whether it is a bipolar or CMOS implementation, the noise figure, generally depends on a ratio of the LNA input signal frequency and a device speed. The smaller this ratio becomes, the better the noise figure is. Therefore, by manipulating the device bias current, both linearity and noise figure can be changed.

Therefore, there is a need for a receiver system comprising a low noise figure and high linearity. There is also a need for a receiver system comprising low average power consumption particularly in mobile and handheld devices.

SUMMARY OF INVENTION

Embodiments of the present invention provide systems and methods for dynamic controlling a tuner in order to reduce power consumption. In exemplary embodiments, a radio receiver comprises a tuner and a digital signal processing hardware (DSPHW). The tuner comprises probes which measures power at several points along the received signal path. The DSPHW receives and analyzes the power probe measurements from the tuner. The DSPHW also demodulates received signals coming from the tuner output, and produces measurements of demodulated signal-to-noise ratio and power level. By analyzing the power probe measurements, the received signal to noise ratio, and the received signal power, the DSPHW determines a desired configuration of the tuner and generates appropriate control signals.

The tuner is configured to receive the control signals from the DSPHW. These control signals control noise figure and linearity characteristic of several components within the tuner by adjusting a current supply to those components. By adjusting current to the tuner components through the control signals, according to the desired configuration, the DSPHW can optimize power consumption of the tuner while allowing for sufficient tuner performance for reliable demodulation of the received signal.

In a further embodiment, the tuner comprises a multi-stage analog filter, where each stage can be turned on/off independently. By turning on stages, the selectivity of the tuner increases, at the expense of increased power consumption. The DSPHW is configured to determine an amount of filtering needed from the tuner, and turns off unneeded filtering stages to reduce the power consumption of the tuner.

BRIEF DESCRIPTION OF THE DRAWINGS

FIG. 6 is an exemplary table that shows classification of desired power and blocker power into categories.

FIG. 7 is an exemplary look up table that maps linearity and noise figure control parameters according to classification of desired power and blocker power.

FIG. 9 is an alternative block diagram of an exemplary amplifier circuitry with noise figure and linearity controllability.

FIG. 12 is block diagram of an exemplary multi-stage filter with an ability to bypass stages.

FIG. 13 is an exemplary circuit showing an implementation of a filter stage.

FIG. 15 is an exemplary table for determining a number of filter stages.

DETAILED DESCRIPTION OF EXEMPLARY EMBODIMENTS

Embodiments of the present invention provide for adaptively optimized power consumption of a receiver device based on instantaneous performance requirements that are necessary for reliable reception. The exemplary system provides a radio receiver comprising a digital signal processing hardware (DSPHW) and a tuner. The DSPHW is configured to monitor a received signal and control components of the tuner to reduce power consumption of the tuner. The reduction of power consumption is desirable in audio devices, and more particularly in mobile or handheld devices. Such handheld and mobile devices can be designed for reception of terrestrial broadcast signals such as FM, NRSC-5, DAB, T-DMB, and DVB-H.

Figure 1:
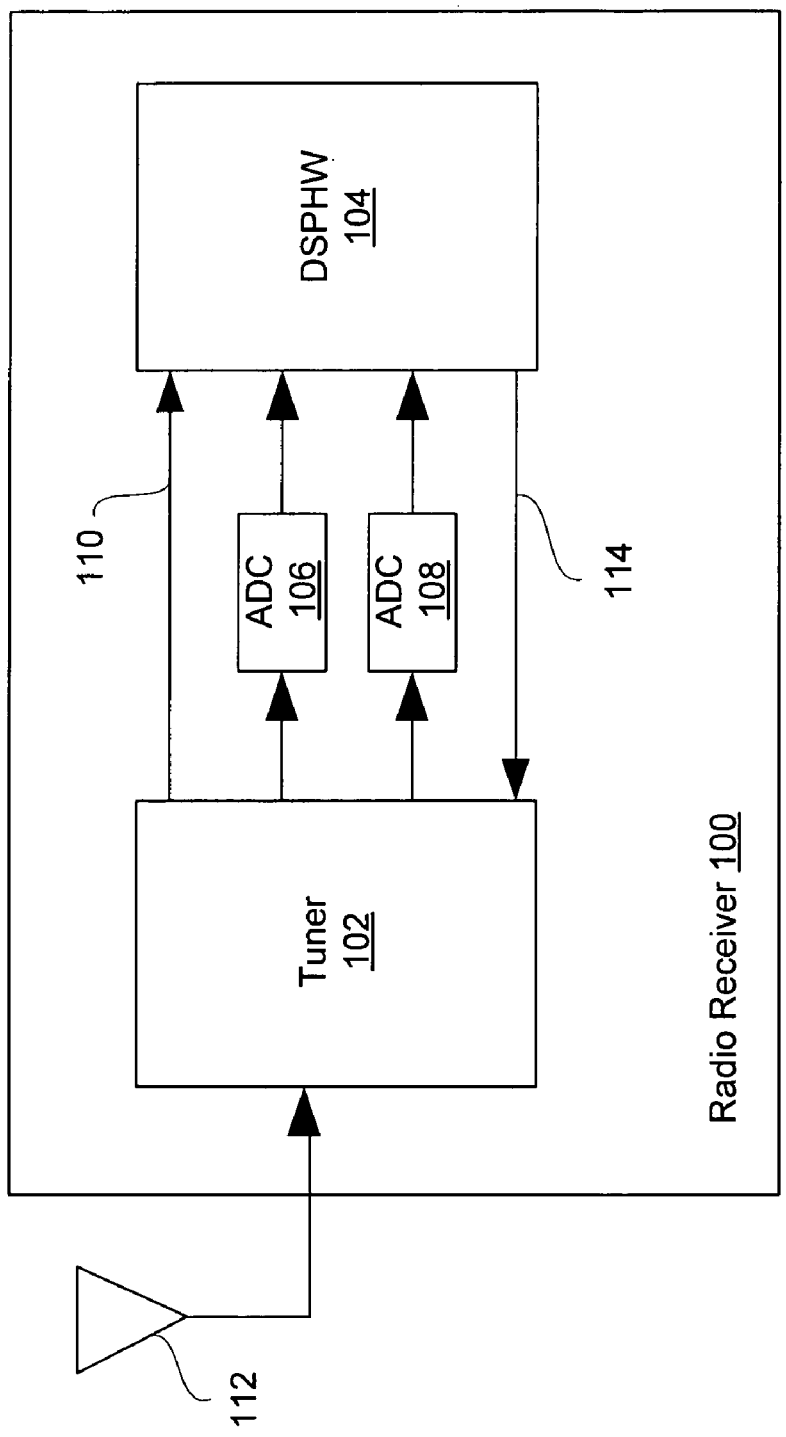
FIG. 1 is a block diagram of an exemplary receiver device.

FIG. 1 shows an exemplary implementation of a radio receiver 100 configured to receive communication signals transmitted over a radio frequency (RF). The radio receiver 100 comprises a tuner 102 and a digital signal processing hardware (DSPHW) 104. The tuner 102 is configured to receive a desired communication channel transmitted over a specific RF band, and down-convert the received signals from the communication channel to some intermediate frequency (IF) or to zero frequency. The down-converted signal can be sampled by one or more analog-to-digital converts (ADC) 106 and 108 to form a digital representation of the down-converted signal. In one embodiment, the DSPHW 104 is implemented with digital logic circuitry in order to demodulate the sampled signal and recover information that is modulated in the sampled signal.

The exemplary tuner 102 is configured to measure average power of the received signal at several points in a processing path of the received signal. A bus 110 provides power measurements from the tuner 102 to the DSPHW 104.

The DSPHW 104 is also configured to measure average power of the sampled received signal at several points in the data processing path. The DSPHW 104 is further configured to measure a signal-to-noise ratio (SNR) of a demodulated signal. The DSPHW 104 uses the SNR measurements and the power measurements provided by the tuner 102 and by the DSPHW 104 to determine a power level of a desired signal and/or a power level of other undesired signals received by an antenna 112. Based on this determination, the DSPHW 104 controls the tuner 102 via control signals sent through a bus 114 to adjust characteristics of amplification components within the tuner 102.

Figure 2:
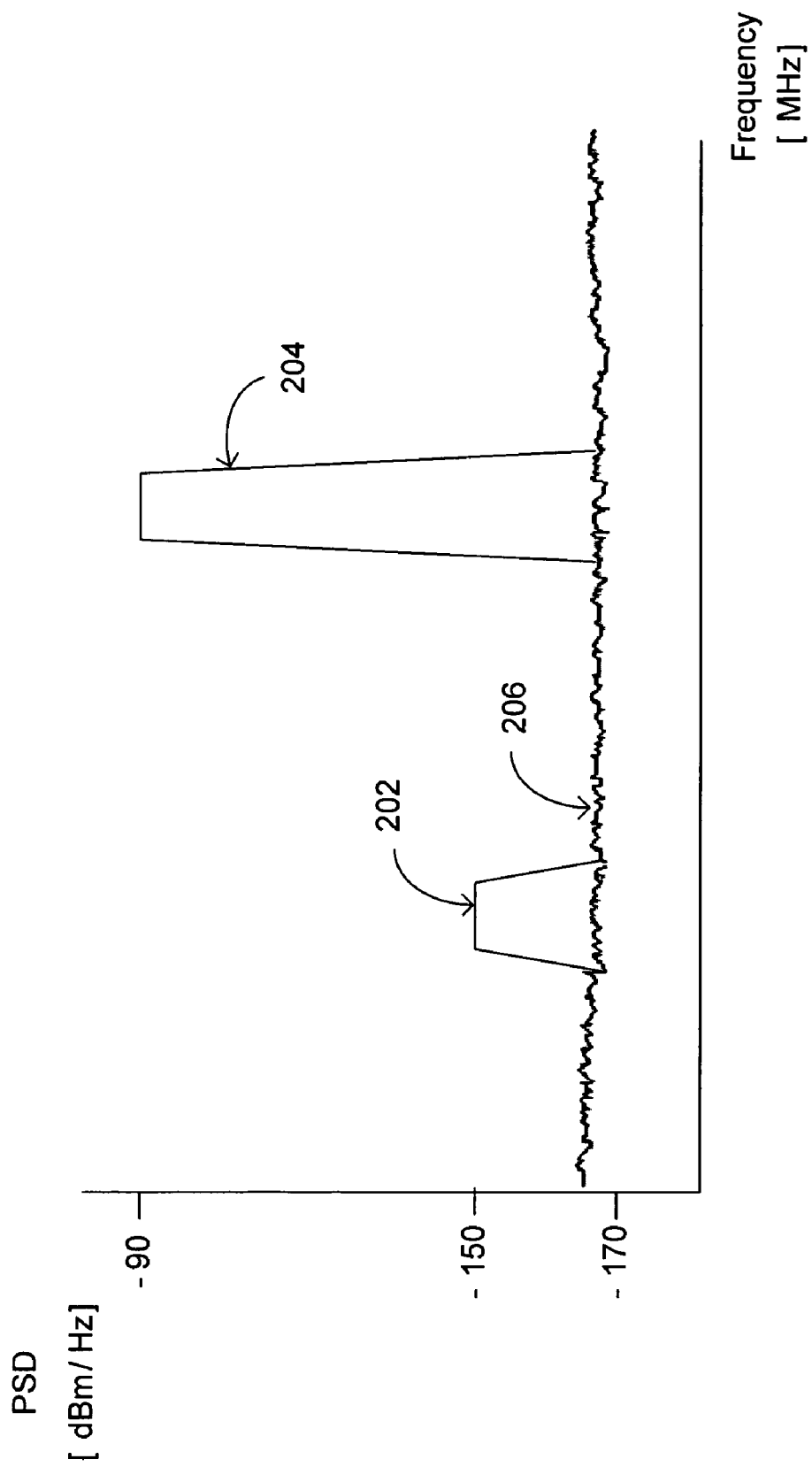
FIG. 2 shows a plot of power spectral density of radio frequency containing a signal of interest and other out of band signals.

Referring now to FIG. 2, an exemplary plot of power spectral density of the signals received by the antenna 112 is shown. The radio receiver 100 is tuned to demodulate a signal of interest 202. In addition to the signal of interest 202, there are other signals present in the RF spectrum outside a band of the signal of interest 202. One such signal is blocker signal 204, which is shown as having a much higher power spectral density than the signal of interest 202. In many cases blocker signals can have a much higher power than the signal of interest.

Non-linear distortions in the components of the tuner 102 can project noise components from the blocker signal 204 into the spectral band of the signal of interest 202. When down-converting the signal of interest 202, the tuner 102 maintains sufficient linearity in the presence of high blocker signals in order to maintain a sufficient signal-to-noise ratio for reliable demodulation. Furthermore, the signal of interest 202 can be received at a power level which is close to power of an in-band noise floor 206. The tuner 102 maintains a low noise figure in order to provide a sufficient signal-to-noise ratio for reliable demodulation of the signal of interest 202.

In one example, the desired signal or signal of interest is a broadcast frequency modulated signal (FM). Such a signal typically resides in a 65 MHz to 108 MHz band. In this embodiment, the blocker signal may be an adjacent FM signal or a broadcast TV signal.

In another example, the desired signal or signal of interest is a digital audio broadcast (DAB) or Terrestrial-Digital Multimedia Broadcast (T-DMB). Such a signal typically resides in a 170 MHz to 250 MHz band or in the L-band. In this embodiment, the blocker signal may be an adjacent DAB/T-DMB signal or a broadcast TV signal.

In another example, the desired signal or signal of interest is a digital video broadcast for handheld (DVB-H). Such a signal typically resides in UHF band (400 MHz-880 MHz,) or in the L-Band. In this embodiment, the blocker signal may be an adjacent DVB-H signal or a DVB-T (digital video broadcast terrestrial) or a broadcast TV signal.

In one example, the desired signal or signal of interest is a broadcast National Radio Systems Committee standard 5 (NRSC-5). Such a signal typically resides in a 65 MHz to 108 MHz band. In this embodiment, the blocker signal may be an adjacent FM signal, NRSC-5 or a broadcast TV signal.

Figure 3:
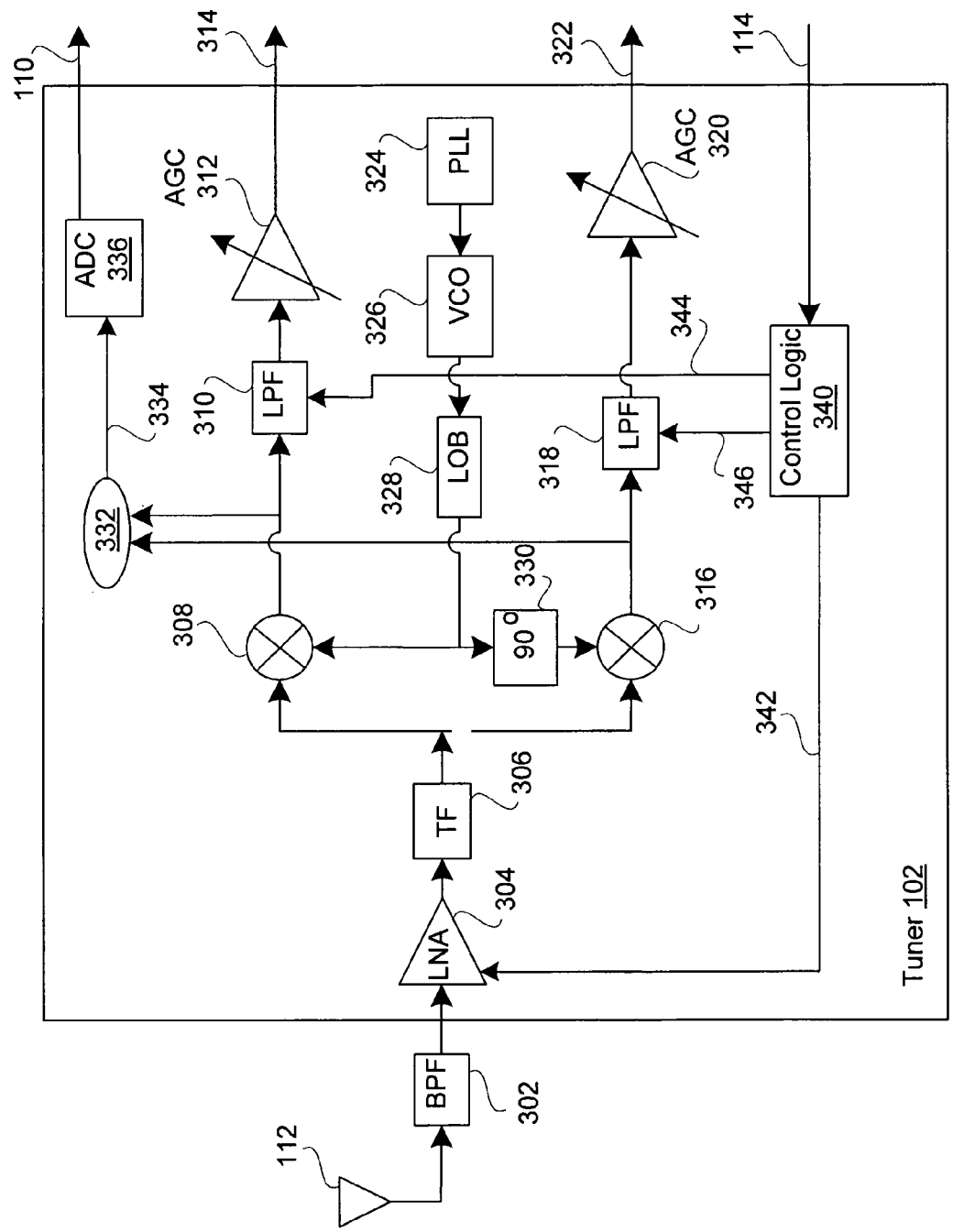
FIG. 3 is a block diagram of an exemplary tuner with direct conversion architecture, integrating power probes, and control lines for adjusting noise figure and linearity.

FIG. 3 is a block diagram of an exemplary tuner 102 having a direct conversion architecture. It should be noted that the methods provided herein can be used in other tuner architecture, such as dual conversion, super heterodyne, or any modified version of the tuner 102.

According to one embodiment, a RF signal is received by the antenna 112 and is sent through a band pass filter 302. The band pass filter 302 provides some frequency selectivity in order to allow a band of interest that contains a signal of interest to pass through.

The output of the band pass filter 302 is an input to the tuner 102. The signal is first amplified by a low noise amplifier 304. The signal is then filtered by a tracking filter 306. The purpose of the tracking filter 306 is to reduce power of signals outside of the band of the signal of interest. The tracking filter 306 is controlled by the DSPHW 104 to be centered on a frequency of the signal of interest.

The signal is then split into two branches, an in-phase branch and a quadrature branch. The signal in the in-phase branch is mixed in a mixer 308 with a sinusoid to produce a replica of the signal which is centered on a low intermediate frequency (IF) or centered on zero frequency (DC). The down-converted signal is then passed through a low pass filter 310 that rejects signals outside of the band of the signal of interest. An automatic gain control (AGC) circuitry 312 adjusts the filtered signal power to a desired level. The AGC circuitry 312 is controlled by the DSPHW 104 to set the desired gain. The AGC circuitry 312 output is sent over a bus 314 to the ADC 106 for sampling.

On the quadrature branch, the signal is mixed in a mixer 316 with a sinusoid shifted by 90 degrees relative to the in-phase sinusoid to produce a replica of the signal centered on a low IF or centered on DC. The down-converted signal is then passed through a low pass filter 318 that rejects signals that are outside the band of the signal of interest. AGC circuitry 320 adjusts the filtered signal power to a desired level. The AGC circuitry 320 is controlled by the DSPHW 104 to set the desired gain. The AGC circuitry 320 output is sent over a bus 322 to the ADC 108 for sampling.

The tuner 102 also comprises a phase-locked loop (PLL) 324, a voltage-controlled oscillator (VCO) 326, and a local oscillator buffer (LOB) 328. These components produce the mixing sinusoid for the mixer 308. A 90-degree shifter 330 shifts the sinusoid phase by 90 degrees to produce the phase shifted sinusoid for the mixer 316.

In one embodiment, the tuner 102 further comprises a power measurement probe 332 which produces a DC voltage that is a function of the combined average power at the output of the mixer 308 and 316. The DC voltage from the probe 332 is transferred through a conducting bus 334 to an analog-to-digital converter (ADC) 336. The ADC 336 produces a digital representation of the DC voltage (denoted as P1) and sends the digital representation to the DSPHW 104 via bus 110.

In further embodiments, the tuner 102 comprises additional power measurement probes. In these embodiments, measurement probes may be implemented after every band selective component that can reduce power of out-of-band signals (e.g., blocker signals) relative to the power of the signal of interest. In one embodiment, some blocker signals may be rejected by the tracking filter 306. In these embodiments, a second probe can be implemented after the low noise amplifier 304 to measure average power of all spectral components before the tracking filter 306.

In an exemplary embodiment of the present invention, the tuner 102 may comprise modified low noise amplifier circuitry and modified low pass filter circuitry. The modified circuitries enable adjustment of the noise figure and linearity characteristics of the circuitries by changing a current consumption of the circuitries. The DSPHW 104 controls the current consumption of circuitries through the bus 114. The control signals received via the bus 114 are decoded in control logic 340 to produce component control signals which are provided via buses 342, 344, and 346 to the low noise amplifier 304 and low pass filters 310 and 318. In another embodiment, the control buses 342, 344, and 346 can directly interface the DSPHW 104. In yet other embodiments, additional tuner components can have noise figure and linearity controllability.

Figure 4:
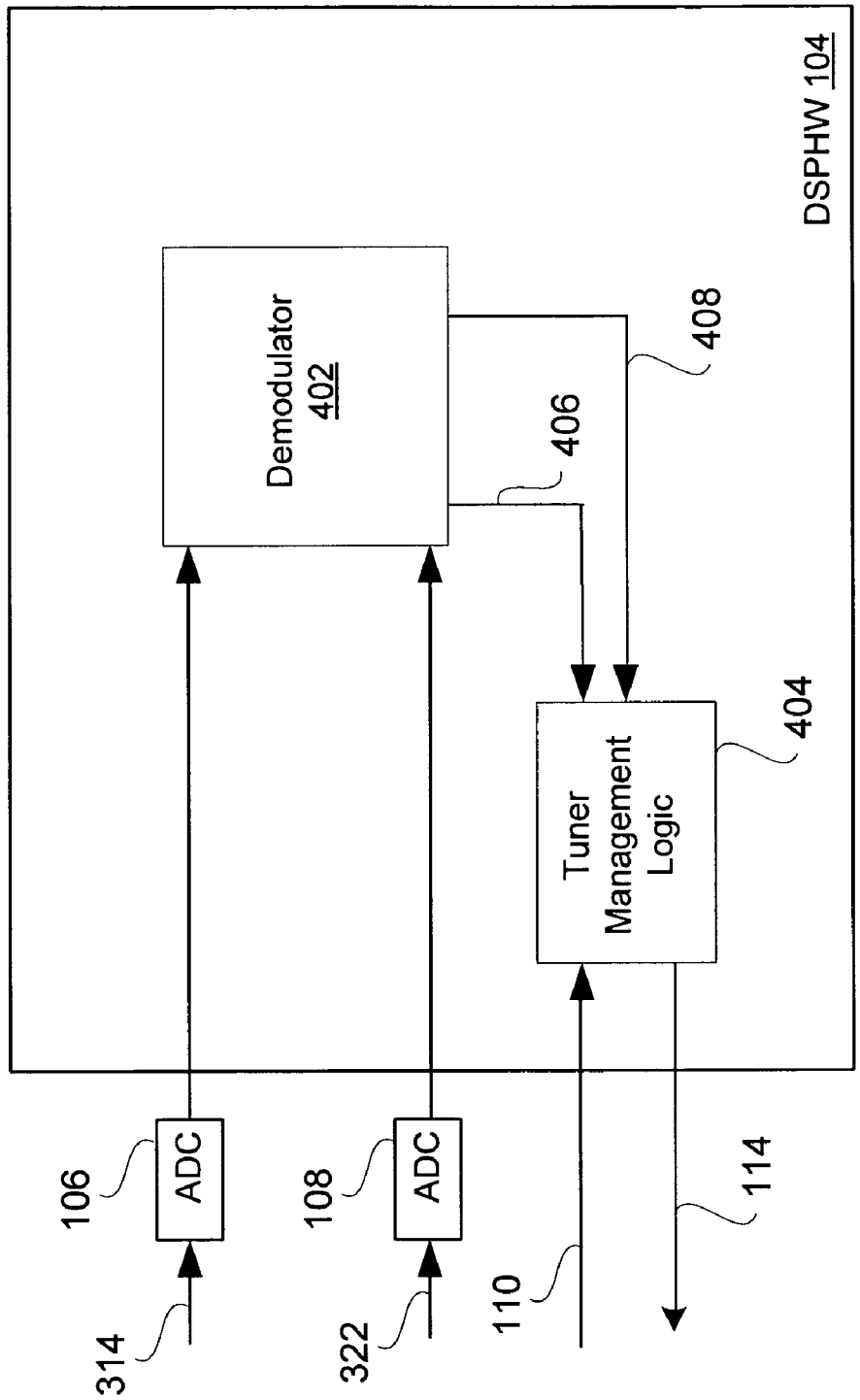
FIG. 4 is a block diagram of an exemplary DSPHW configured to control a tuner.

FIG. 4 is a block diagram of the exemplary DSPHW 104. The in-phase and quadrature modulated RF signals received via the buses 314 and 322 are sampled by the ADC 106 and 108, respectively, to produce sampled representations of the down-converted signals. The DSPHW 104 receives the sampled signals and demodulates the signals using a demodulator 402. The demodulation methods performed by the demodulator 402 depend on a transmitted signal type. For example, the transmission may be DAB or T-DMB broadcast. In this case a differential quadrature phase shift key (DQPSK) is used, and demodulation methods for such transmission as known to one skilled in the art are utilized. In another example, analog frequency modulation (FM) is used for which methods for demodulating such signal are also known to one skilled in the art.

The DSPHW 104 further comprises power measurement logic. In one embodiment, the power management logic is embodied within the demodulator 402. The exemplary power management logic performs the following operation to compute the power measurement:

$$Pav[n]=Pav[n-1]\cdot(1-ALPHA)+ALPHA\cdot(Iin[n]^2+Qin[n]^2)$$

where: n is an incrementing index that counts the input samples. Pav[n] is the average power at the nth sample after adjacent channels filtering. ALPHA is a programmable value between zero and one. Iin[n] is the inphase signal $n^{th}$ sample coming from the ADC 106 after adjacent channel rejection. Qin[n] is the quadrature signal $n^{th}$ sample coming from the ADC 108 after adjacent channel rejection.

The output of power measurement logic (denoted as Pav [n]) is an average power estimate of a desired in-band signal at the nth sample. Pav[n] is then sent to tuner management logic (TML) 404 via bus 406.

The DSPHW 104 further comprises digital logic circuitry as part of the demodulator 402. The digital logic circuitry measures the signal-to-noise ratio (SNR) of the demodulated signal of interest. The SNR measurement method can vary according to different embodiments of the present invention (e.g., depending on the transmitted signal type). Methods of calculating SNR are known to one skilled in the art. The SNR measurement is then sent to the tuner management logic 404 via bus 408.

In alternative embodiments, the power measurement logic and/or the digital logic circuitry may reside outside of the demodulator 402 but be coupled thereto.

In an exemplary embodiment, the DSPHW 104 comprises a digital logic tuner management logic 404. This tuner management logic 404 receives, as input, the power measurements Pav and SNR from the buses 406 and 408, respectively, and the power measurements from the tuner 102 via bus 110. The tuner management logic 404 implements methods to adaptively determine the required noise figure and linearity characteristics of the components of the tuner 102. In alternative embodiments, the tuner management logic 404 functionality may be implemented by a programmable processor as part of the demodulation execution sequence performed by the programmable processor.

Figure 5A:
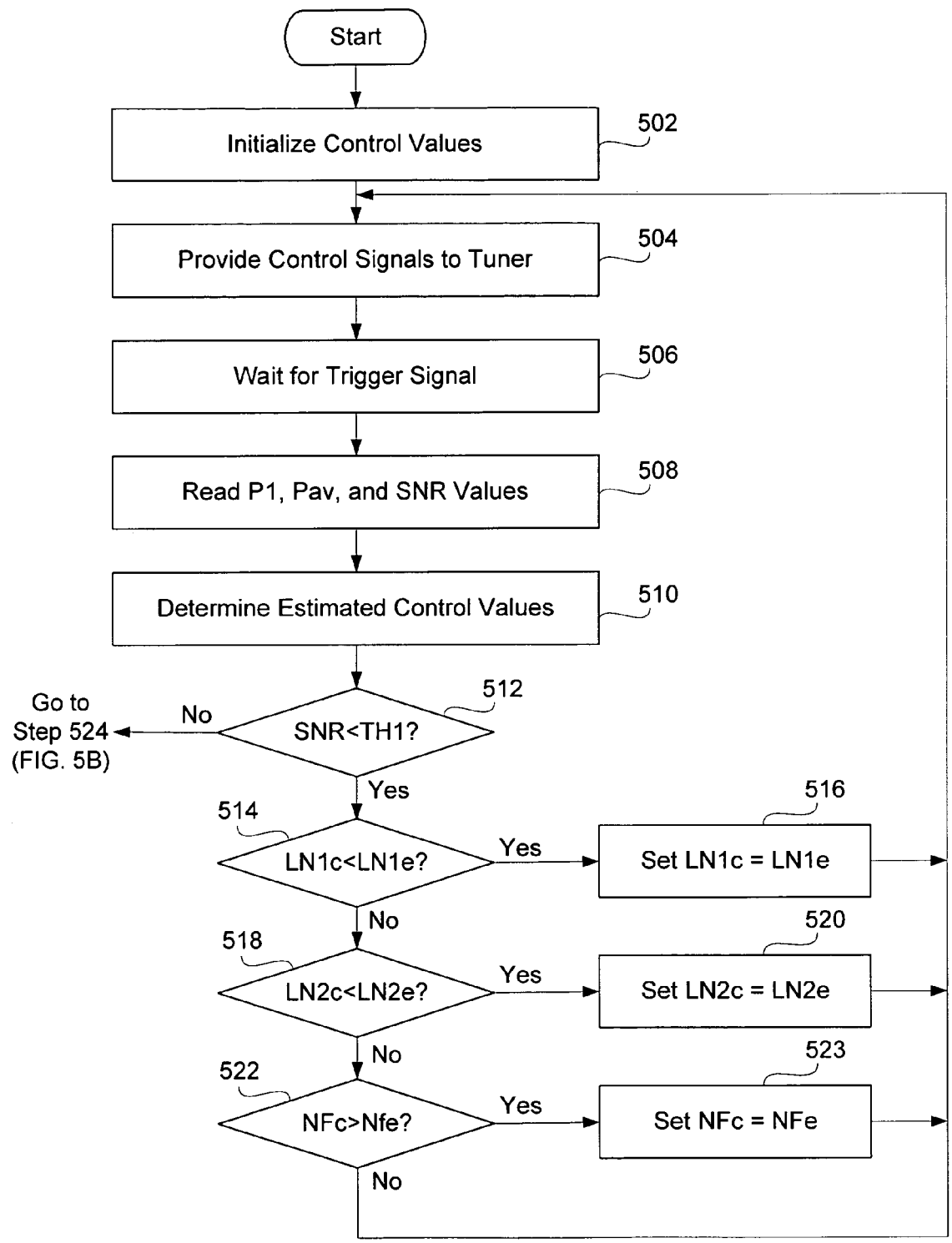
FIG. 5A-FIG. 5C are exemplary flowcharts of a method for managing an adaptive tuner.
Figure 5B:
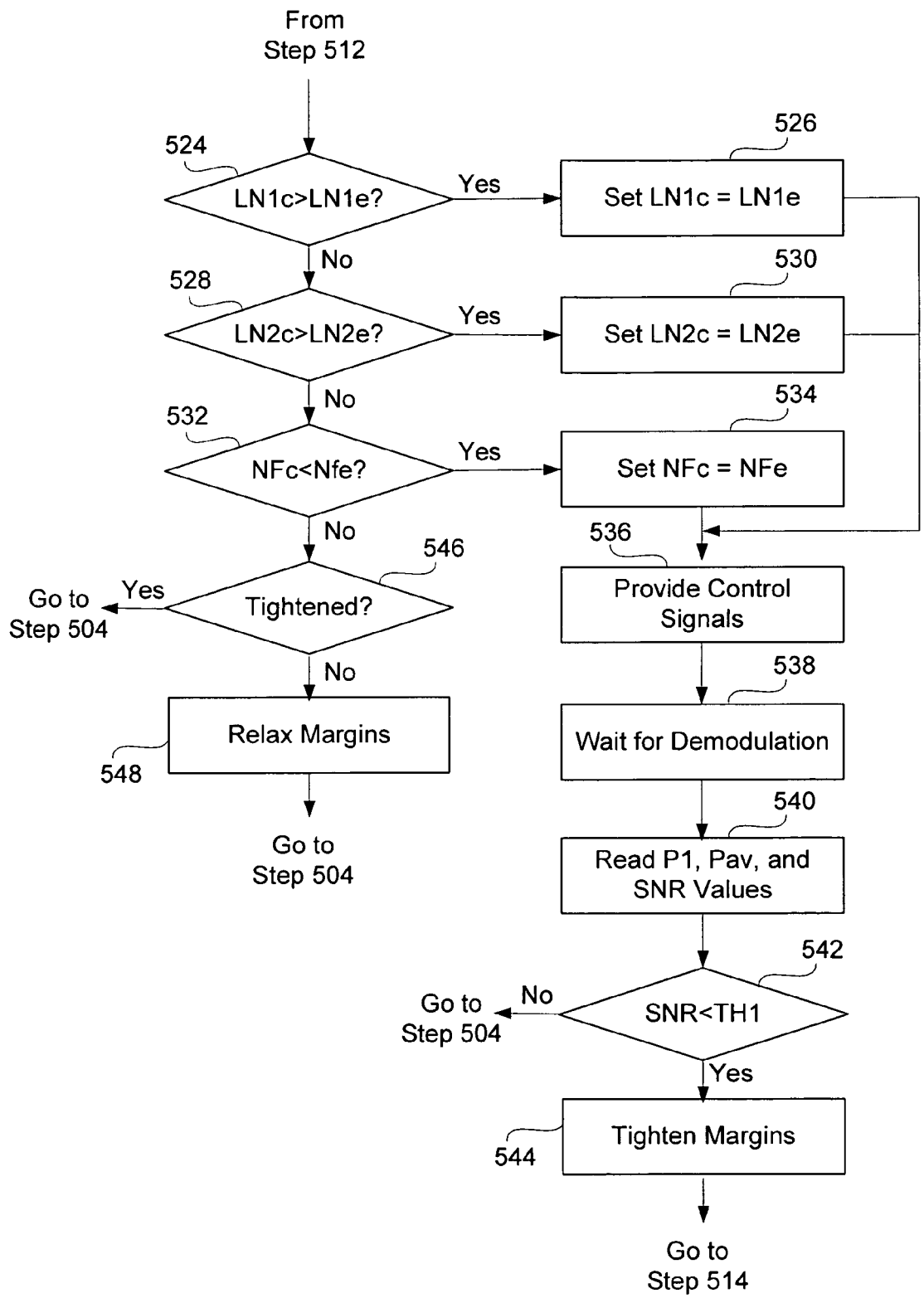
Figure 5C:
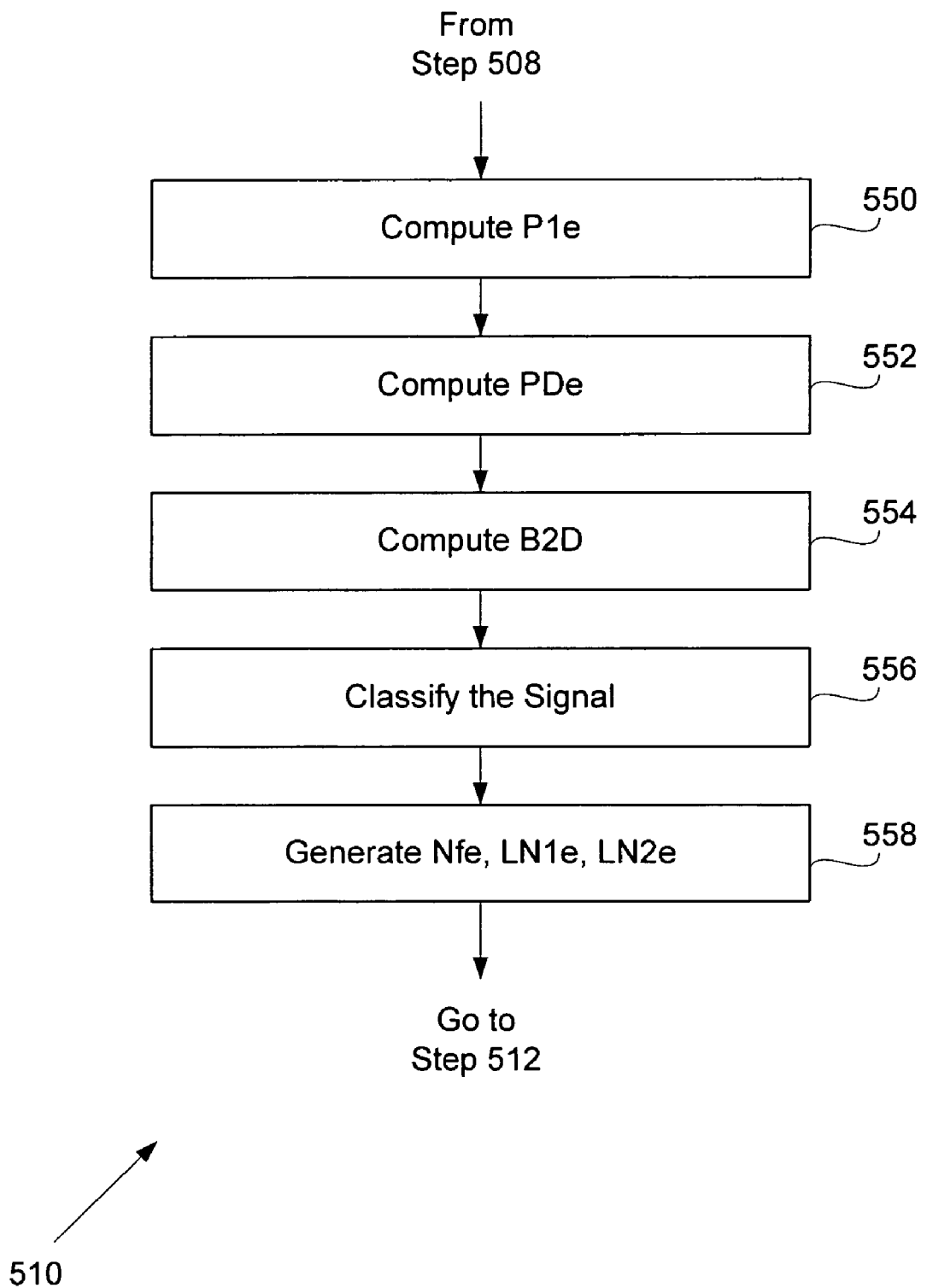

Referring now to FIG. 5A-FIG. 5C, exemplary flowcharts of a method to dynamically control the tuner 102 (FIG. 1) is shown. In exemplary embodiments, the method is performed by the tuner management logic 404 (FIG. 4). In step 502, parameters are initialized with default values in the tuner management logic 404. These parameters comprise NFc, LN1c and LN2c. NFc represents a current noise figure control signal for the low noise amplifier 304, and low pass filters 310 and 318 (FIG. 3). LNc1 represents a current linearity level control signal for the low noise amplifier 304, while LNc2 represents a current linearity control signal for the low pass filters 310 and 318. In alternative embodiments, other tuner 102 components can be controlled for noise figure and linearity characteristics. In these embodiments, a plurality of additional parameters may be initialized and calculated in the tuner management logic 404.

In step 504, the tuner management logic 404 provides the (initialized) current control signals (NFc, LN1c and LN2c) to the tuner 102. In exemplary embodiments, the control signals are sent to the control logic 340 via bus 114. The control logic 340 decodes NFc and LN1c to provide component control signals to the low noise amplifier 304 via bus 342. The control logic 340 also decodes NFc and LN2c to provide component control signals to the low pass filters 310 and 318 via buses 344 and 346.

In step 506, the tuner management logic 404 waits for a trigger signal from the demodulator 402 that indicates that a block of signals has been demodulated and that updated values of P1, Pav, and SNR are available. In various embodiments, the size of the block of signals may vary depending on the received signal type. In an exemplary example, the received signal is an orthogonal frequency division multiplexing (OFDM) signal. In this example, the block size may comprise one or more OFDM symbols. In an alternative example, the received signal is analog FM channel. In this example, a block is defined as a finite duration segment of the received signal having sufficient duration to perform reliable SNR and power measurement.

Upon receiving the trigger signal, the tuner management logic 404 reads the values of P1, Pav, and SNR in step 508. In exemplary embodiments, the values of P1, Pav, and SNR are received via bus 110, 406, and 408, respectively. In one embodiment, the P1, Pav, and SNR values are converted into decibel units by the tuner management logic 404.

Using the read values, estimates of control signals (NFe, LN1e, and LN2e) that are necessary for reliable detection are determined in step 510. The estimation method is described in more detail in connection with FIG. 5C below.

In step 512, the SNR value read in step 508 is compared to a threshold value, TH1. TH1 is a predetermined value that corresponds to a SNR threshold that guarantees reliable detection of the received signal within a margin. If the SNR value is less than TH1, the tuner management logic 404 checks if the noise figure and the linearity characteristics of the tuner 102 should be tightened in order to improve the SNR. In step 514, the current LN1c is compared to the estimated required value LN1e. If LN1c is less than LN1e, then LN1c is set equal to LN1e in step 516. Similarly in step 518, the current LN2c is compared to the estimated required value LN2e. If LN2c is less than LN2e, then LN2c is set equal to LN2e in step 520. In step 522, current NFc is compared with estimated NFe. If NFc is greater than NFe, then NFc is set equal to NFe in step 523. If none of the conditions of step 514, 518, and 522 are met or after any of the steps 516, 520, or 522, the method returns to step 504 in order to provide the current control signal to the tuner 102.

If the SNR value is greater than the threshold TH1, the tuner management logic 404 checks if the noise figure and linearity of the tuner 102 components can be relaxed in order to reduce the power consumption of the tuner 102. Referring now to FIG. 5B, the current LN1c is compared to the estimated required value LN1e in step 524. If LN1c is greater than LN1e, then LN1c is set equal to LN1e in step 526. Similarly in step 528, the current LN2c is compared to the estimated required value LN2e. If LN2c is greater than LN2e, then LN2c is set equal to LN2e in step 530. In step 532, current NFc is compared with estimated NFe. If NFc is less than NFe, then NFc is set equal to NFe in step 534.

If one of the conditions of steps 524, 528, or 532 are met, then the method proceeds to step 536. Steps 536, 538, 540, and 542 perform similar functions as steps 504, 506, 508, and 510 as previously discussed above. Performance of steps 536, 538, 540, and 542 insures that the relaxation of LN1c, LN2c, and NFc does not reduce the SNR below the SNR threshold TH2. TH2 is a predetermined threshold equal to TH1+MR, where MR is a positive value which provides additional SNR margins.

In step 544, estimation margins of LN1e, LN2e, and NFe are tightened by decreasing THb1 and THb2 by a predetermined empiric power increment value ΔTHb, where THb1 and THb2 are predetermined power thresholds which determine the power category of the blocker signals. Similarly, THpd1 and THpd2 are increased by a predetermined empiric power increment value ΔTHpd, where THpd1 and THpd2 are predetermined power thresholds which determine the power category of the desired signal. FIG. 6, discussed below, describes the usage of THb1, THb2, THpd1 and THpd2 for categorizing the blocker signals and the desired signal into power categories. The method then returns to step 514.

If none of the conditions of steps 524, 528, and 532 are met, then in step 546, a determination is made as to whether THpd1, THpd2, THb1, and THb2 have been tightened in the last Nb data blocks, where Nb is a predetermine integer. If these margins have been tightened, then the method returns to step 504. If these margins have not been tightened, the estimation margins of LN1e, LN2e, and NFe are relaxed by increasing THb1 and THb2 by a predetermined empiric power increment value DrTHb and decreasing THpd1 and THpd2 by a predetermined empiric power increment value DrTHpd in step 548. The method then returns to step 504.

Referring now to FIG. 5C, the estimation method of step 510 is described in more detail. In step 550, the estimate of the signal power at the low noise amplifier 304 (P1e) input is computed. P1e is determined by subtracting the known gains of the low noise amplifier 304, tracking filter 306, and mixers 308 and 316 from the measured power P1. In exemplary embodiments, the gain is known by design or can be measured.

Next in step 552, the estimate of the desired signal power at the low noise amplifier 304 (PDe) input is calculated. In one embodiment, PDe is determined by subtracting from Pav total known gains of the tuner 102 and ADCs 106 and 108 and further subtracting from Pav a known total data-path gain.

In step 554, the blocker to desired signal power ratio (B2D) is computed. In one embodiment, B2D is determined by the formula: B2D=P1e−PDe.

The signal at the low noise amplifier 304 input is classified into desired signal power and blocker power categories in step 556. In one embodiment, three desired power levels are defined—high, medium, and low. FIG. 6 shows an exemplary table that is used by the tuner management logic 404 to classify the signal at the low noise amplifier 304 input into one of nine possible categories. As shown in the table, PDe is compared to two predetermined thresholds THpd1 and THpd2 to determine into which desired power category to classify the signal. B2D is compared to two predetermined thresholds THb1 and THb2 to determine into which blocker power category to classify the signal.

In step 558, an estimated required noise figure control value, NFe, and estimated required linearity control values, LN1e and LN2e, are determined. In one embodiment, a look-up table having nine entries is used to determine NFe, LN1e, and LN2e. FIG. 7 illustrates an exemplary embodiment of the look-up table containing predetermined NFe, LN1e and LN2e values. Each entry in the look-up table corresponds to one of the nine categories shown in the table of FIG. 6.

It should be noted that in alternative embodiments, modifications to the flow diagram can be made without departing from the scope of the methods described herein. For example, steps may be performed in a different order.

Figure 8:
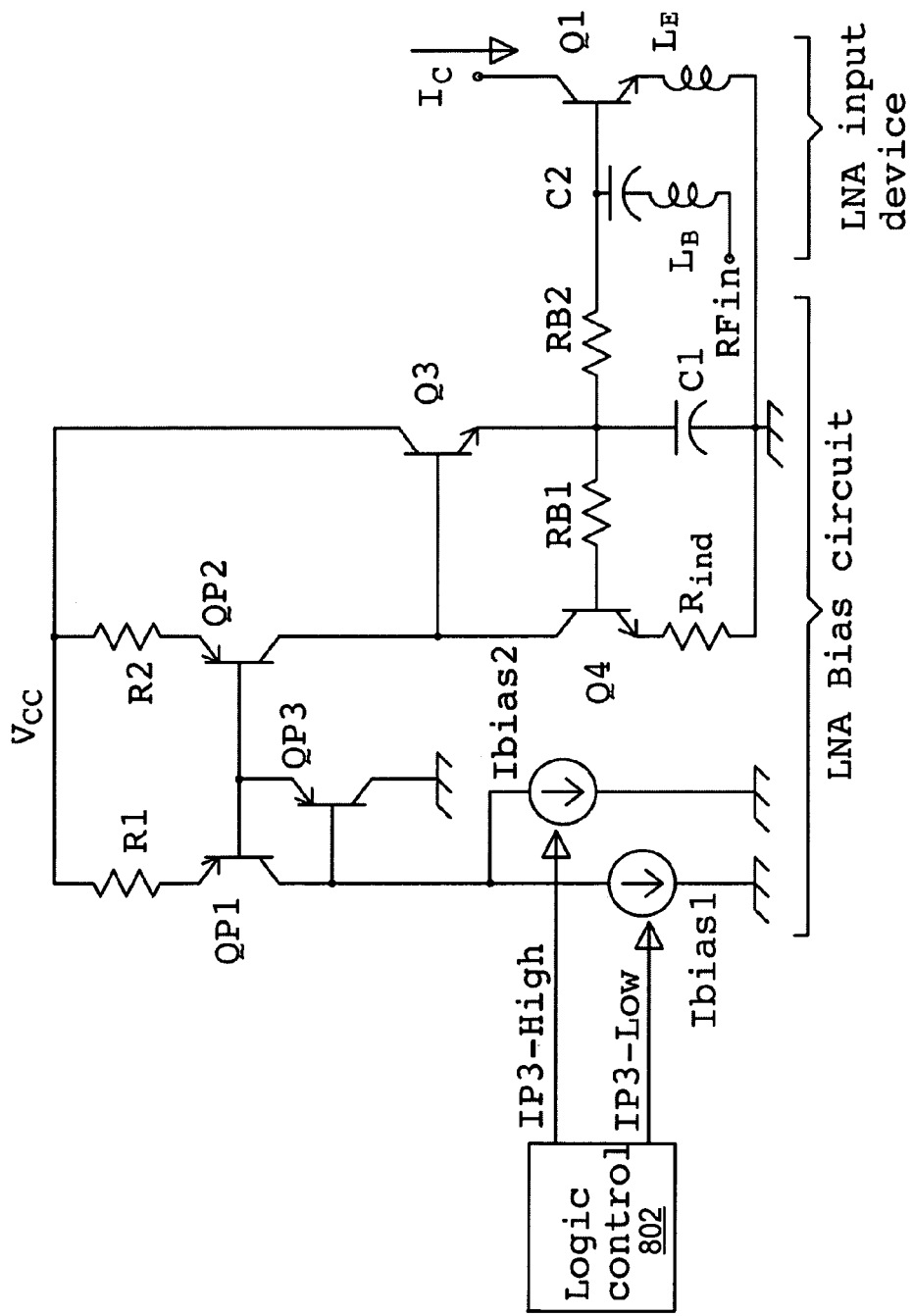
FIG. 8 is a block diagram of an exemplary amplifier circuitry with noise figure and linearity controllability.

Referring now to FIG. 8, an exemplary modified amplifier circuitry capable of receiving control signals to modify current consumption of power and modify noise figure and linearity characteristics of the circuitry is shown. The linearity of the low noise amplifier input device, Q1, is dependent on the DC bias current. The linearity, mainly IP3, increases roughly by 6 dB when doubling the bias current. The noise figure stays almost constant while linearity is varied. A control logic 802 switches on and off reference bias currents of different values, which then is mirrored to a low noise amplifier core device.

FIG. 9 is another exemplary block diagram of a modified amplifier circuitry capable of receiving control signal to modify noise figure and linearity characteristics of the circuitry. Ideally, a main path low noise amplifier 902 has a best noise figure and moderate linearity. When an input RF signal is strong, a bypass switch 904 is turned on and the main low noise amplifier 902 is turned off to save current. With the bypass switch 904 on, the amplifier linearity is drastically increased at the expense of increased noise figure.

In some embodiments, it is desirable to design the low noise amplifier with a gain setting midway between a maximum high gain and a bypass low gain. This mode is often referred to as a medium gain mode. A linearity requirement is typically the same between high gain and medium gain modes, and the noise figure requirement is usually much more relaxed in the medium gain mode.

Figure 10:
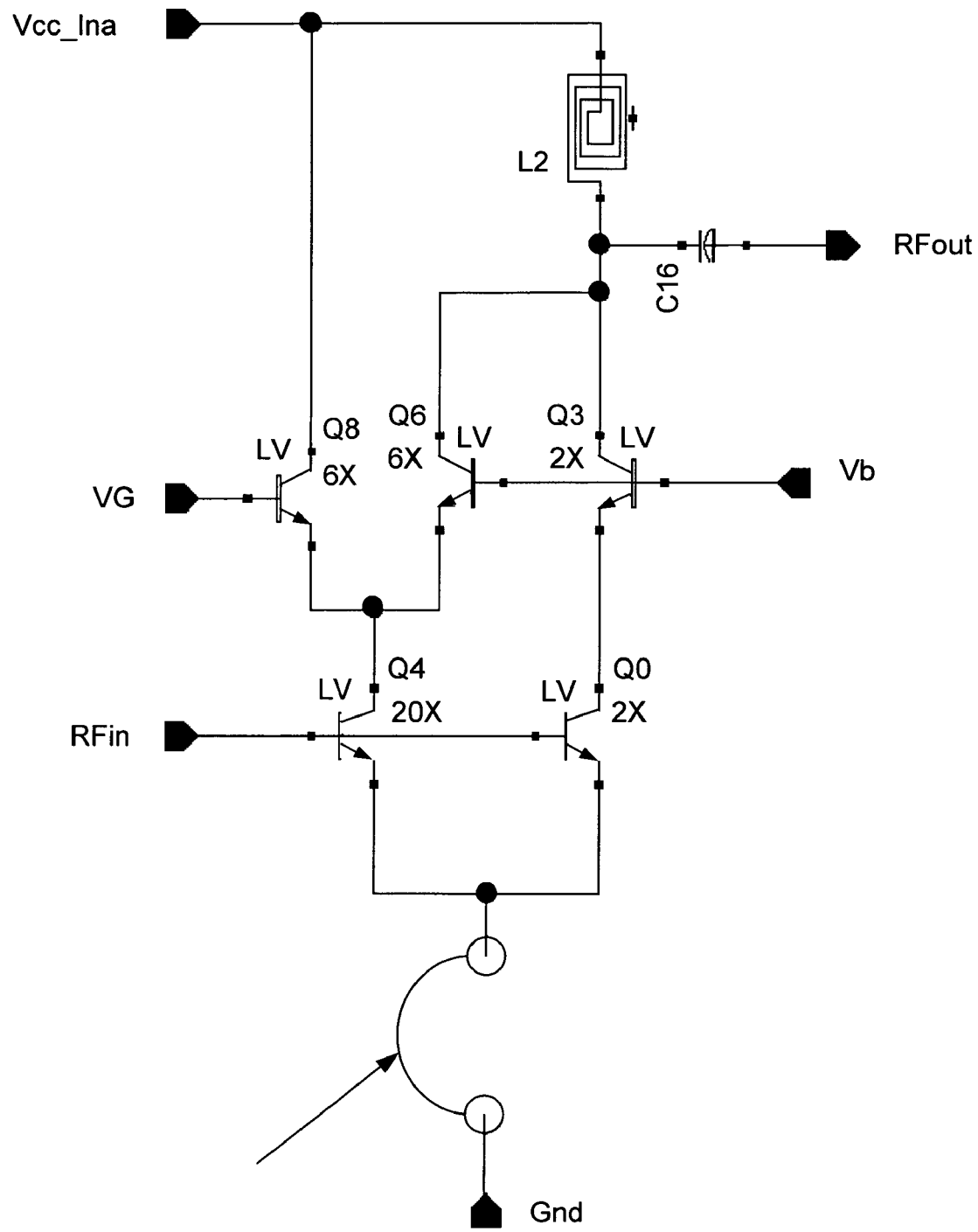
FIG. 10 is a further embodiment of a block diagram showing an exemplary amplifier circuitry with noise figure and linearity controllability through implementing a medium and high gain mode low noise amplifier.

FIG. 10 shows an example of a medium gain mode circuit implementation. When a digital logic signal VG is low, Q0, Q4, Q3, and Q6 appear in parallel resulting in a high gain mode for the low noise amplifier. In contrast, when VG is high, Q8 turns on and steers away all the current of Q6 to a VCC and away from the load. Hence only a portion of the RF current reaches the output resulting in a medium gain mode for the low noise amplifier. The ratio between the gain in both modes equals that of the device ratio of Q4 to (Q0+Q4).

Figure 11:
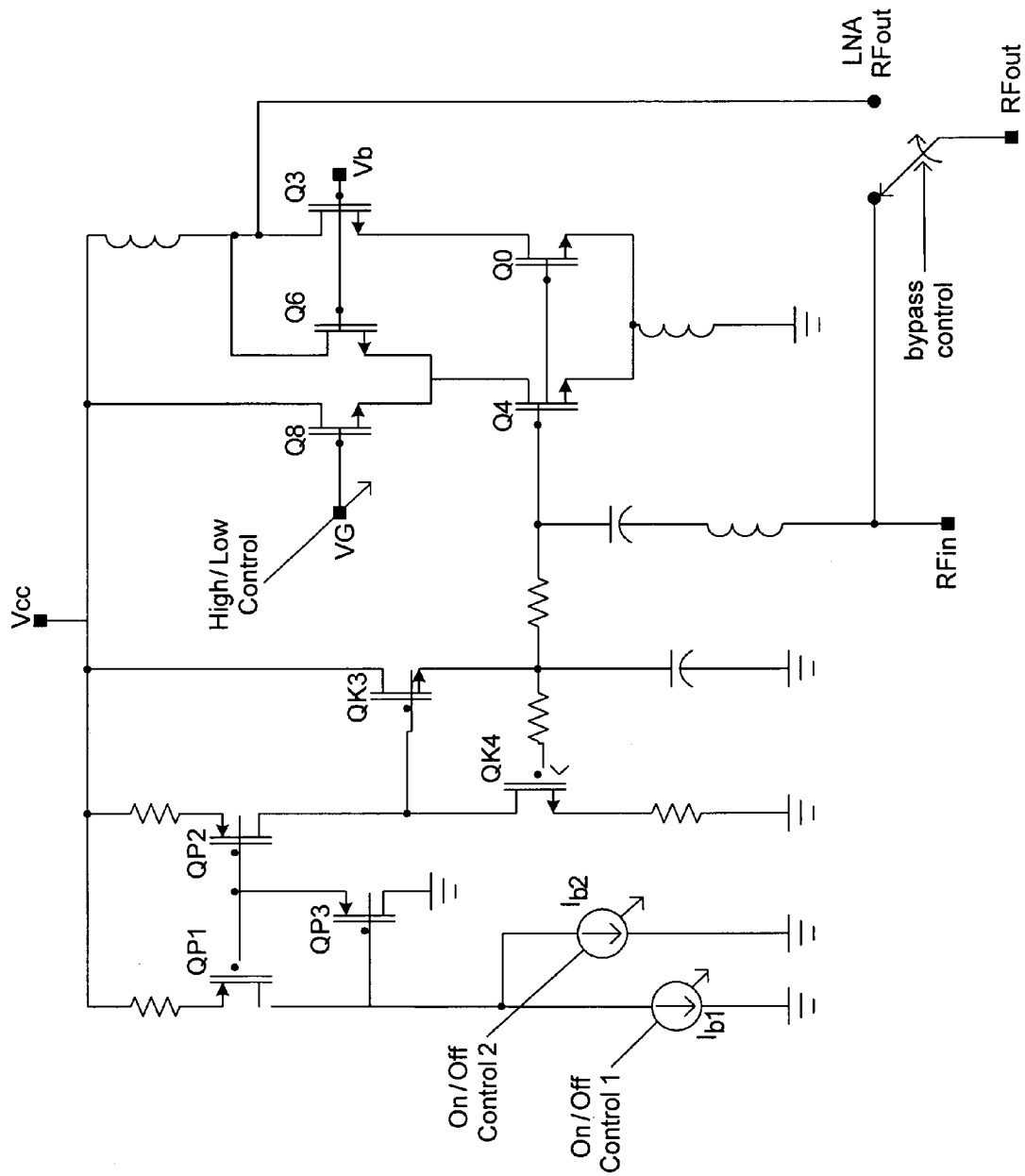
FIG. 11 is another alternative block diagram of an exemplary amplifier circuitry with noise figure and linearity controllability.

FIG. 11 shows an exemplary low noise amplifier implementation in accordance with an embodiment capable of providing low, medium, and high gain modes and low and high linearity in the same device. This low noise amplifier circuitry combines functionalities of the low noise amplifier circuitries of FIG. 8, FIG. 9, and FIG. 10.

FIG. 12 shows an exemplary implementation of the low pass filters 310 and 318 of FIG. 3. The low pass filters 310 and 318 comprise a first filter stage 1202 and a second filter stage 1204. The second filter stage 1204 can be bypassed by activating a switch 1206 to a bypass position. When the second filter stage 1204 is bypassed, the current source to the second filter stage 1204 is turned off, such that the second filter stage 1204 consumes no power or very little power compared to when the second filter stage 1204 is not bypassed. Each filter stage 1202 and 1204 can be a low order infinite impulse response filter (e.g., a first or a second order filter such as Butterworth, Chebyshev or elliptic filter). A cascade of two filter stages results in a combined higher order filter, thereby providing better rejection of adjacent channels. Setting one of the filters stages 1202 or 1204 in bypass results in less rejection of adjacent channel, but lower power consumption by the filters. The same operation of the exemplary system of FIG. 12 can be extended to any number of filter stages, where some or all of the filter stages can be set to bypass and the power to the filter stage can be turned off.

FIG. 13. illustrates an exemplary implementation of the filter stage 1202 or 1204 of FIG. 12. The implementation shows a second order biquadratic active filter. In exemplary embodiments, the DSPHW 104 controls activation or bypass of the filter stages 1202 or 1204. The DSPHW 104 will continuously monitor the received signal to choose a minimum number of filter stages that is sufficient for reliable demodulation of the signal.

Figure 14:
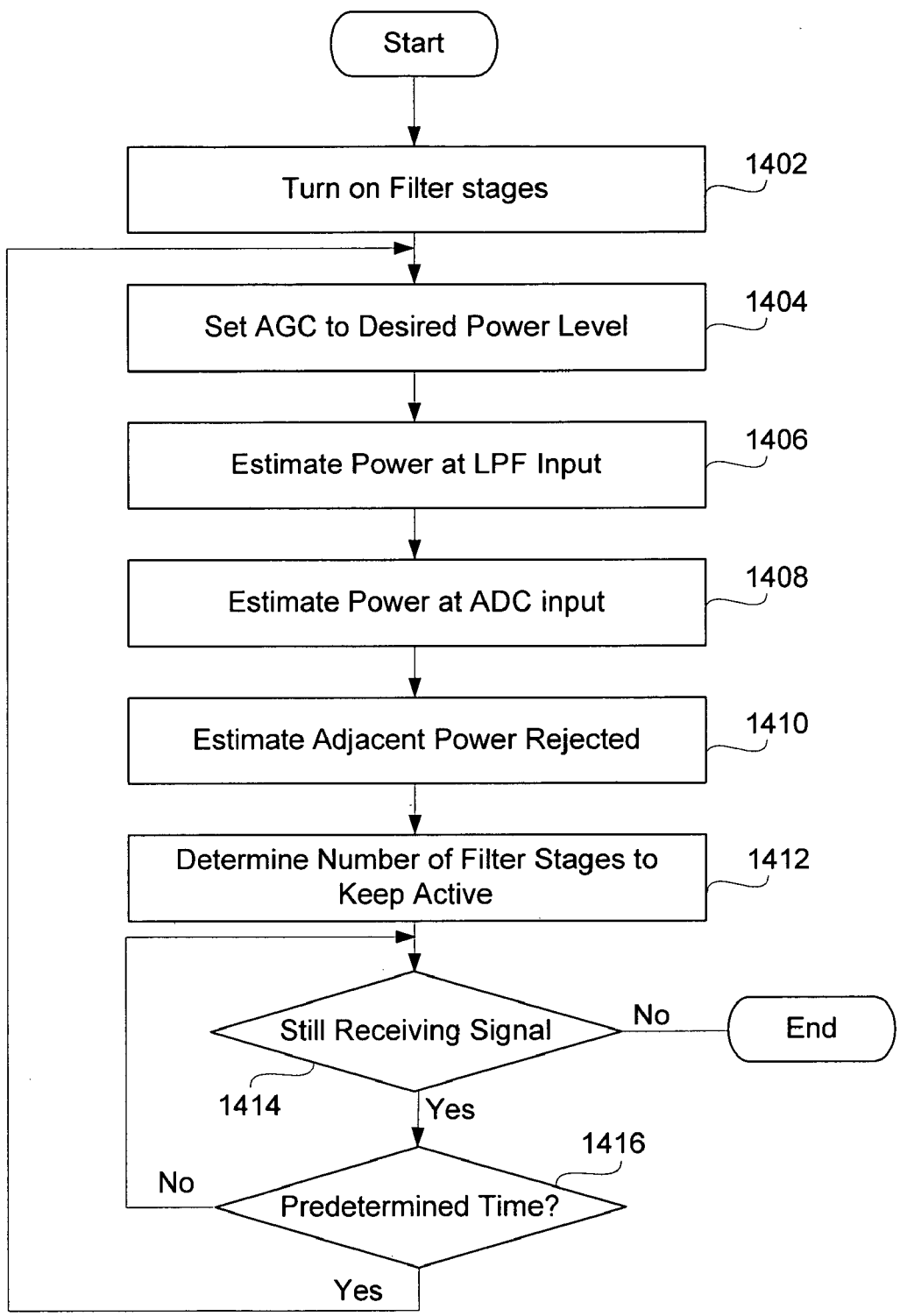
FIG. 14 is an exemplary flowchart of a method for determining a number of filter stages.

In one embodiment, the DSPHW 104 determines the number of required filter stages according to the method shown in FIG. 14. In step 1402, all filter stages are turned on. Next, the DSPHW 104 sets the automatic gain control (e.g., AGC 312 or 320) to a desired power level at the ADC (e.g., ADC 106 or 108) input in step 1404. In step 1406, the DSPHW 104 uses a power probe measurement at the input of the low pass filter (e.g., low pass filter 310 or 318) to estimate P_lpf, the power at the low pass filter input. The DSPHW 104 then uses the power measurements at the output of the ADC to estimate P_adc, the power at the ADC input in step 1408. In step 1410, the DSPHW 104 calculates an estimation of the adjacent power rejected by the low pass filter: P_adj=P_lpf−P_adc. P_adj.

In step 1412, the DSPHW 104 compares P_adj to a set of predetermined thresholds and decide how many filter stages to keep active according to the exemplary table shown in FIG. 15. The table can be extended to any number of stages by setting the appropriate number of thresholds.

If a signal is still being received (step 1414), periodically (step 1414) the DSPHW 104 repeats steps 1404-1412 during demodulation in order to adjust the selectivity such adjacent channels are attenuated with the minimum number of filter stages in order to reduce the power consumed by the low pass filter.

Embodiments of the present invention have been described above with reference to exemplary embodiments. It will be apparent to those skilled in the art that various modifications may be made and other embodiments can be used without departing from the broader scope of the invention. Therefore, these and other variations upon the exemplary embodiments are intended to be covered by the present invention.

What is claimed is:

1. A system for power conservation in a receiver device, the system comprising:
a tuner configured to receive a terrestrial broadcast signal;
digital signal processing hardware that:
measures signal-to-noise ratio of a demodulated signal of interest, wherein the demodulated signal of interest is based on the terrestrial signal, and
determines an average power of an in-band signal within the demodulated signal of interest; and
tuner management logic executable to generate a control signal that independently switches a plurality of components within the tuner between a plurality of modes to conserve power, wherein the control signal is based on a comparison of the average power of the in-band signal within the demodulated signal of interest and the measured signal-to-noise ratio of the demodulated signal of interest.

2. The system of claim 1 wherein the modes comprise a low gain mode, a medium gain mode, and high gain mode.

3. The system of claim 1 wherein the modes comprise a low linearity, a medium linearity, and a high linearity mode.

4. The system of claim 1 wherein the modes comprise intermediate gain modes and intermediate linearity modes.

5. The system of claim 1 wherein the plurality of components that are independently controlled through control signals from the execution of the tuner management logic include a low noise amplifier, a first low pass filter, and a second low pass filter.

6. The system of claim 1 wherein the tuner further comprises probes configured to measure power at several points along a path of the received signal.

7. The system of claim 1 wherein the digital signal processing hardware further demodulates signals received from the tuner.

8. The system of claim 1 wherein the tuner further comprises at least one filter having a plurality of filter stages, the filter stages being selectively switched off when less filter stages are required in order to reduce power consumption of the tuner.

9. The system of claim 1, wherein the terrestrial broadcast signal is an NRSC-5 standard signal.

10. The system of claim 1, wherein the plurality of modes includes at least three modes.

11. A system for power conservation in a receiver device, comprising:

a tuner configured to:
   receive a NRSC-5 standard signal, and
   measure power at several points along a path of the received NRSC-5 standard signal;
digital signal processing hardware that:
   measures signal-to-noise ratio of the received NRSC-5 standard signal, and
   determines an average power of a desired in-band signal within the received NRSC-5 standard signal; and
tuner management logic executable to generate a control signal that independently switches a plurality of components within the tuner between a plurality of modes to conserve power, wherein the control signal is based on a comparison of the average power of the desired in-band signal within the received NRSC-5 standard signal and the measured signal-to-noise ratio of the received NRSC-5 standard signal.

* * * * *